United States Patent [19]

Mosciatti

[11] 3,910,526

[45] Oct. 7, 1975

[54] PNEUMATIC TAPE-THREADING APPARATUS FOR TAPE TRANSPORT

[75] Inventor: Roger Mosciatti, Coram, N.Y.

[73] Assignee: Bucode, Inc., Bohemia, N.Y.

[22] Filed: Apr. 12, 1974

[21] Appl. No.: 460,478

[52] U.S. Cl. ................ 242/182; 242/195; 242/209; 360/130

[51] Int. Cl.² .................... G11B 15/58; G11B 23/12

[58] Field of Search ............................ 242/182–198, 242/209; 226/95, 97; 360/130

[56] References Cited

UNITED STATES PATENTS

| | | | |
|---|---|---|---|
| 3,371,882 | 3/1968 | Orlando et al. | 242/209 |
| 3,393,878 | 7/1968 | Aweida et al. | 242/182 |
| 3,617,650 | 11/1971 | Morello | 242/182 |
| 3,620,478 | 11/1971 | Fitzgerald et al. | 242/197 |
| 3,627,226 | 12/1971 | Setter | 242/185 |
| 3,643,890 | 2/1972 | Milligan et al. | 242/182 |
| 3,791,607 | 2/1974 | Klang et al. | 242/184 |
| 3,795,371 | 3/1974 | Tolini et al. | 242/182 |
| 3,823,895 | 7/1974 | Jones et al. | 242/182 |

*Primary Examiner*—Leonard D. Christian
*Attorney, Agent, or Firm*—Darby & Darby

[57] ABSTRACT

A pneumatic tape-threading apparatus for tape reels of various sizes and cartridges in combination with a tape transport having a supply reel and a take-up reel rotatably mounted thereon, the plane of the supply and take-up reels being in a substantially horizontal plane; the vacuum columns associated with the tape transport extending in a lateral direction and being positioned adjacent one another; air jets being provided about the periphery of the take-up reel and along the tape-threading path between the take-up reel and the supply reel; vacuum ports being associated with the take-up reel; optical sensing apparatus for determining tape reel size; a movable platform in the path of a tape cartridge latching element which supports the side edge of the tape in the tape-threading path; a movable block located within a cartridge retainer element which provides an air supply to the cartridge and also to air jets associated with the cartridge retainer element; and a movable cartridge retaining lug which holds the cartridge securely in place.

10 Claims, 17 Drawing Figures

PNEUMATIC TAPE-THREADING APPARATUS FOR TAPE TRANSPORT

BACKGROUND OF THE INVENTION

This invention generally relates to apparatus for automatically feeding and threading tape from a supply reel to a take-up reel in a tape transport, regardless of the angle of the plane of the supply reel and the take-up reel.

In magnetic tape transports heretofore available which were capable of automatically threading the leading end of the tape from a rotatably mounted take-up reel to a rotatably mounted supply reel in a tape transport having vacuum columns, the plane of the take-up reel and supply reel has always been vertical. It has been found that in tape transports where the plane of the take-up and supply reels was substantially horizontal, a substantial saving in the space occupied by the tape transport could be accomplished. However, when the tape path is located in a substantially horizontal plane, it is difficult to accomplish automatic threading of the tape from the supply reel to the take-up reel primarily because no assistance in threading the tape is provided by the force of gravity when the tape path is in a substantially horizontal plane. When the tape path is in the vertical plane, gravity forces the leading end of the tape downwardly from the supply reel towards the entrance to the tape path. When the tape path is in a substantially horizontal plane, this does not occur because gravitational forces act on the side edge of the tape rather than on the leading end of the tape.

The fact that gravitational forces act on the side edge of the tape when the tape path is in a substantially horizontal plane further enhances the problems of such tape transports because of the difficulty in handling reels of different sizes. Tape transports must be able to handle reels smaller than the standard ten and one-half inch reel which is commonly used in computer applications. It has been found in transports in which the tape path is in a substantially horizontal plane that the tape has a tendency to fall out of the smaller reels sidewise unless some type of edge support is provided for the tape.

Another problem common to tape transports having tape paths in either the vertical or horizontal planes is the simplified threading of the standard 10 ½ inch reels, tape reels smaller than the standard 10 ½ inch reel, such as reels 8 ½ inches in diameter to reels seven inches in diameter and even smaller and also the standard ten and one-half inch reels located within a cartridge, such as the "Easy Load" tape cartridge manufactured by IBM. Because of the differences in sizes of these various reels and the different structure of the reels and the tape cartridge, a problem exists in being able to provide a uniform procedure for automatic threading of the tape from these various size reels and from the cartridge.

SUMMARY OF THE INVENTION

The present invention provides apparatus for automatically feeding and threading tape from a supply reel to a take-up reel when the plane in which the tape moves is either vertical, horizontal or some angle in between. Basically, this is accomplished by positioning a series of air jets about the outer periphery of the supply reel and along the tape path for pneumatically controlling the movement of the tape from the take-up reel through the tape path and onto the supply reel.

The tape on a standard ten and one-half inch reel, whether by itself or within a cartridge, is truly automatically threaded by the apparatus provided by this invention. By this is meant that no manual intervention is required in order to thread the tape after the supply reel is placed on the tape transport hub and the load button on the transport is pushed. There is no need to manually thread the supply reel nor position the leading end of the tape within a chute, as is common in tape transports presently available.

Tape reels whose diameter is less than 10 ½ inches are automatically threaded only after the leading end of the tape is manually fed from the supply reel and the leading edge of the tape is placed within a chute in the tape path of the machine.

One feature of this invention is that apparatus is provided for sensing the size of the tape reel which is placed on the hub in order to control the circuitry which controls the rotation of the hub on which the supply reel is positioned. This permits the hub to unwind the supply reel when a 10 ½ inch reel or a cartridge with a 10 ½ inch reel is placed on the hub for purposes of beginning the automatic tape-threading operation after the load button is pushed. However, when tape reels smaller than the 10 ½ inch reel are positioned on the hub, the unwinding step is automatically ignored after the load button is pushed because the reel must be manually unwound first, as explained above.

Another feature of this invention is that apparatus is provided for the automatic threading of a 10 ½ inch reel and a 10 ½ inch reel located within a cartridge when either is in a substantially horizontal plane and when the vacuum colums extend in a lateral direction. A tape cartridge commonly includes a latching mechanism which must be opened after the cartridge is positioned on the hub in order to permit the supply reel to be unreeled. There must be sufficient space for the cartridge lever to swing open. However, because the vacuum columns of the tape transport of the invention extend in a lateral direction thereby occupying the space beneath the tape path and because the tape path of the tape transport of this invention lies in a substantially horizontal plane, it is necessary to provide support for the edge of the tape, which must pass directly adjacent the cartridge lever. This is accomplished in the tape transport of this invention by providing means for lowering a platform which normally provides edge support for the tape in the tape path when the cartridge lever is being opened and closed and means for raising the platform and maintaining it raised at all times when the tape is in the tape path.

Another feature of this invention relates to apparatus for providing means for connecting the air supply used for the jets to the tape cartridge. This permits the same air supply to be used during the automatic threading of a ten and one-half inch reel and also during the automatic threading of tape in a cartridge.

Structural features and the complete nature of the automatic threading apparatus of the tape transport of this invention will become apparent from the ensuing specification and the appended claims in which the invention is defined, particularly when taken in conjunction with the accompanying illustrative drawings setting forth a preferred embodiment of the invention.

DESCRIPTION OF A PREFERRED EMBODIMENT

Figure 1:
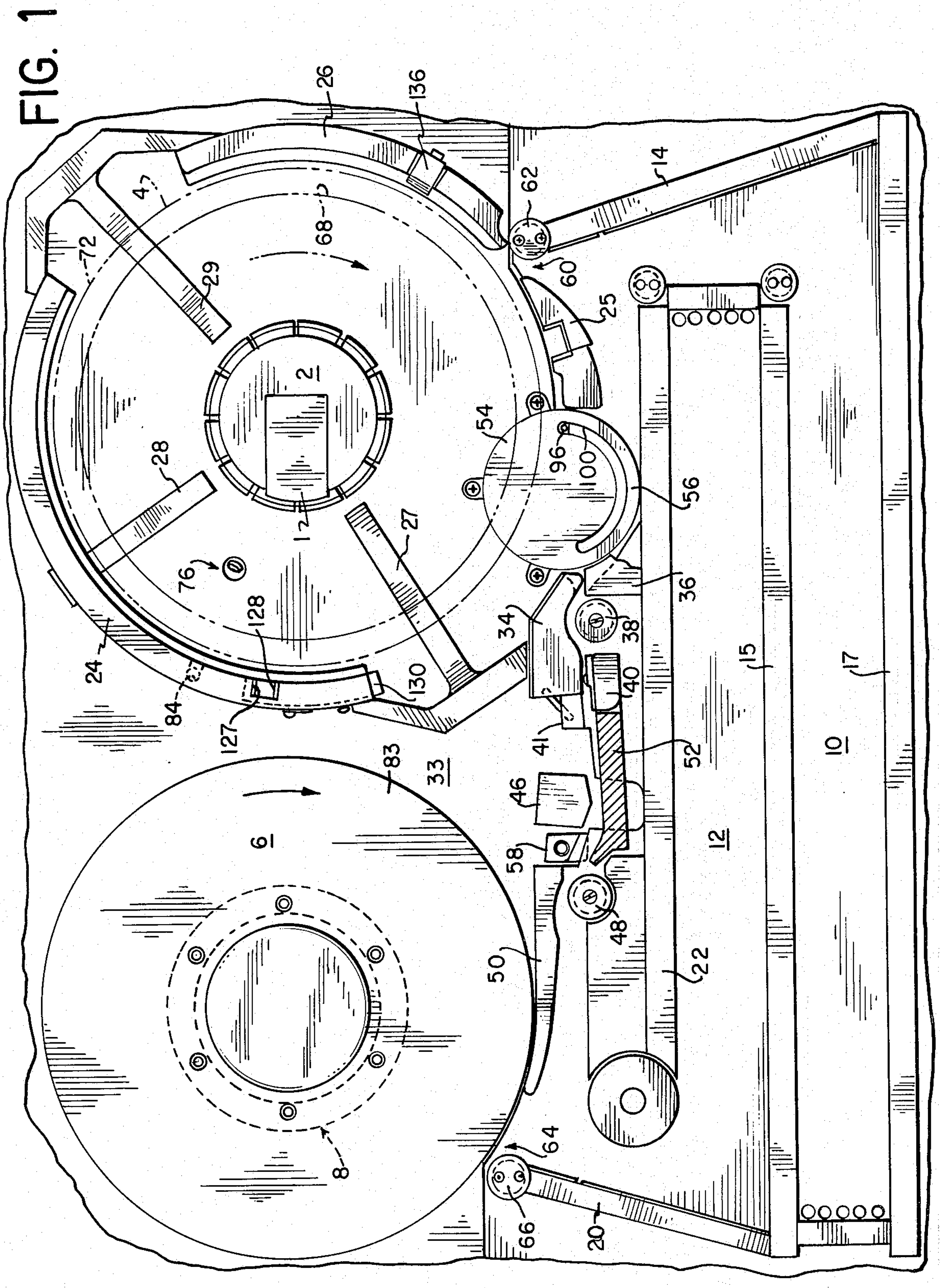
FIG. 1 is a plan view of a magnetic tape transport according to this invention.

Referring now in more detail to the drawings, a tape transport embodying the present invention is illustrated in FIG. 1. In the preferred embodiment discussed here, the plane of the tape transport illustrated in FIG. 1 forms an angle of approximately 12° with the horizontal, so that the plane of the tape transport angles slightly upwardly from the horizontal from the lowermost rail 17 of the lowermost vacuum column 10 to the top of the tape reels 4 and 6.

The tape transport illustrated in FIG. 1 includes a hub 2 for the supply reel 4 (illustrated in phantom on the right side of the machine) and a take-up reel which includes a hub core 8 on the left side of the machine. The hub 2 on which the supply reel 4 is mounted may be of the type described in U.S. patent application Ser. No. 359,451, filed May 11, 1973 for Self-Positioning Reel Latching Hub.

The tape transport further includes laterally disposed vacuum columns 10 and 12 which may be the same as the vacuum columns described in U.S. Pat. No. 3,791,607 for Light Collecting and Transmitting Apparatus which issued Feb. 12, 1974. The tape path shown in this last mentioned patent is the same as the tape path in the tape transport of the present invention.

The vacuum column 10 is defined by angled rail 14 and laterally extending rails 15 and 17. The vacuum column 12 is defined by angled rail 20 and laterally extending rails 22 and 15.

Circumferential cartridge retainer segments 24, 25 and 26 are positioned about the outermost periphery of the tape reel 4, which in this drawing is the standard ten and one-half inch diameter reel which is commonly used in computer applications.

Radially emanating ridges 27, 28 and 29 are formed on the base surface 33 of the tape transport which is represented by vertical shade lines. The ridges 27, 28 and 29 act to support the tape during the reeling-in operation described below.

Moving from left to right, in the direction of the tape path, the tape transport includes tape guide blocks 34 and 36 which are positioned adjacent round tape guide 38; a mechanism 40 for detecting the end of the tape; and a tape cleaner 41. The tape transport further includes a magnetic read-write head 46, tape guide block 58, a second round tape guide 48 and a tape guiding block 50. The cross-sectioned portion adjacent the read-write head 46 in FIG. 1 is a projection 52 from the cover (not shown) of the tape transport. The cover is needed in order to maintain the vacuum in the vacuum columns. The projection 52 forms a guide block for the tape when the cover is closed.

The tape transport also contains a cartridge-latching-/unlatching mechanism 54 and a platform member 56 which supports the side edge of the tape, both of which are described in more detail below.

Generally, the tape path during the automatic feeding and threading operation of the tape is through the chute 60 defined by the end of the cartridge retainer element 25 and the air bearing 62; around the rounded edge of the cartridge retainer element 25; over the platform member 56; between the guide 38 and the tape guide block 34; between the tape-sensing mechanism 40 and the tape cleaner 41; past the read-write head 46; over the surface of tape guide block 58; between the guide 48 and the tape-guiding block 50 and through the chute 64 defined by the end of the tape-guiding block 50 and the air bearing 66.

Figure 2A:
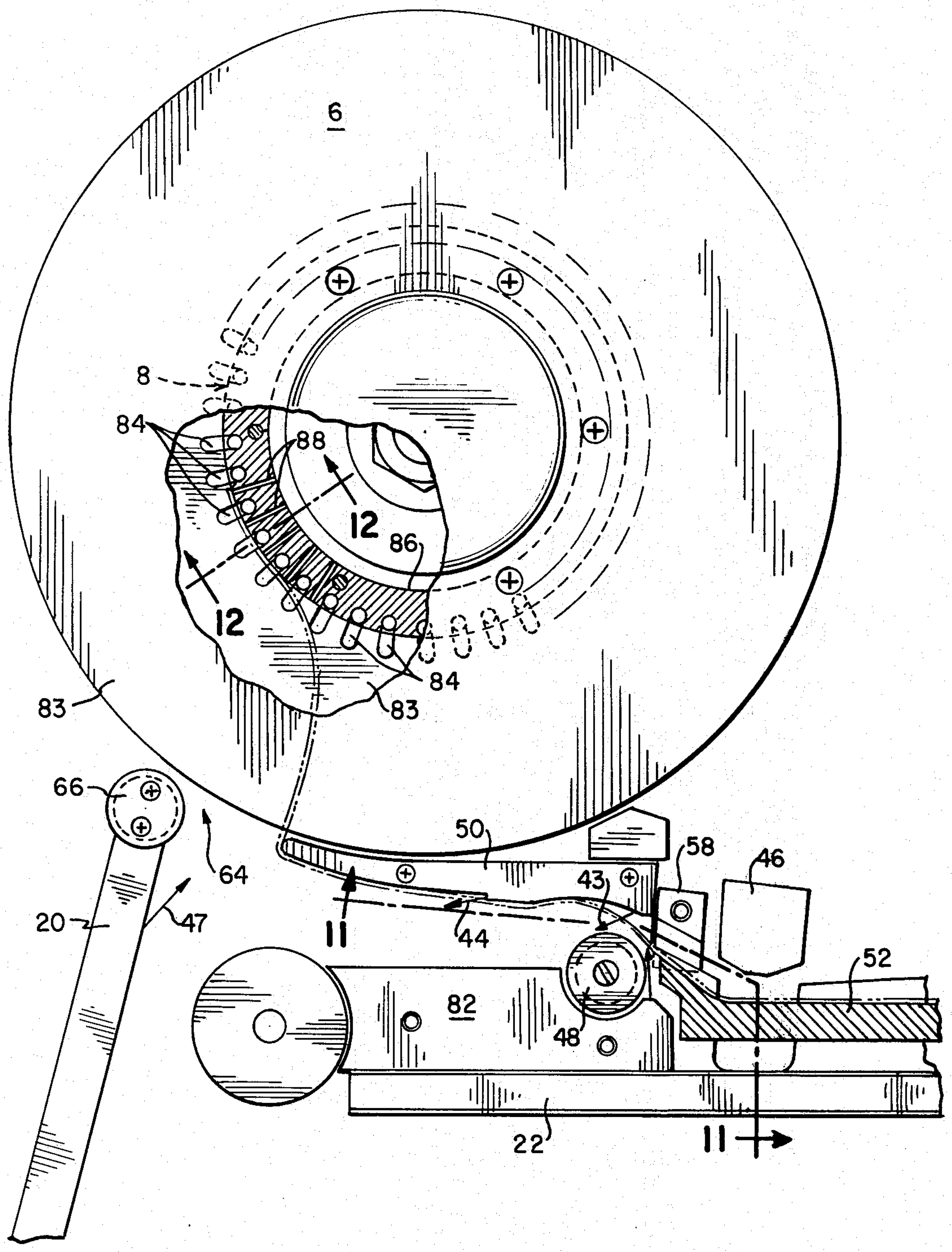
FIG. 2A is an enlarged plan view of the take-up reel of the tape transport illustrated in FIG. 1 with parts broken away.
Figure 2B:
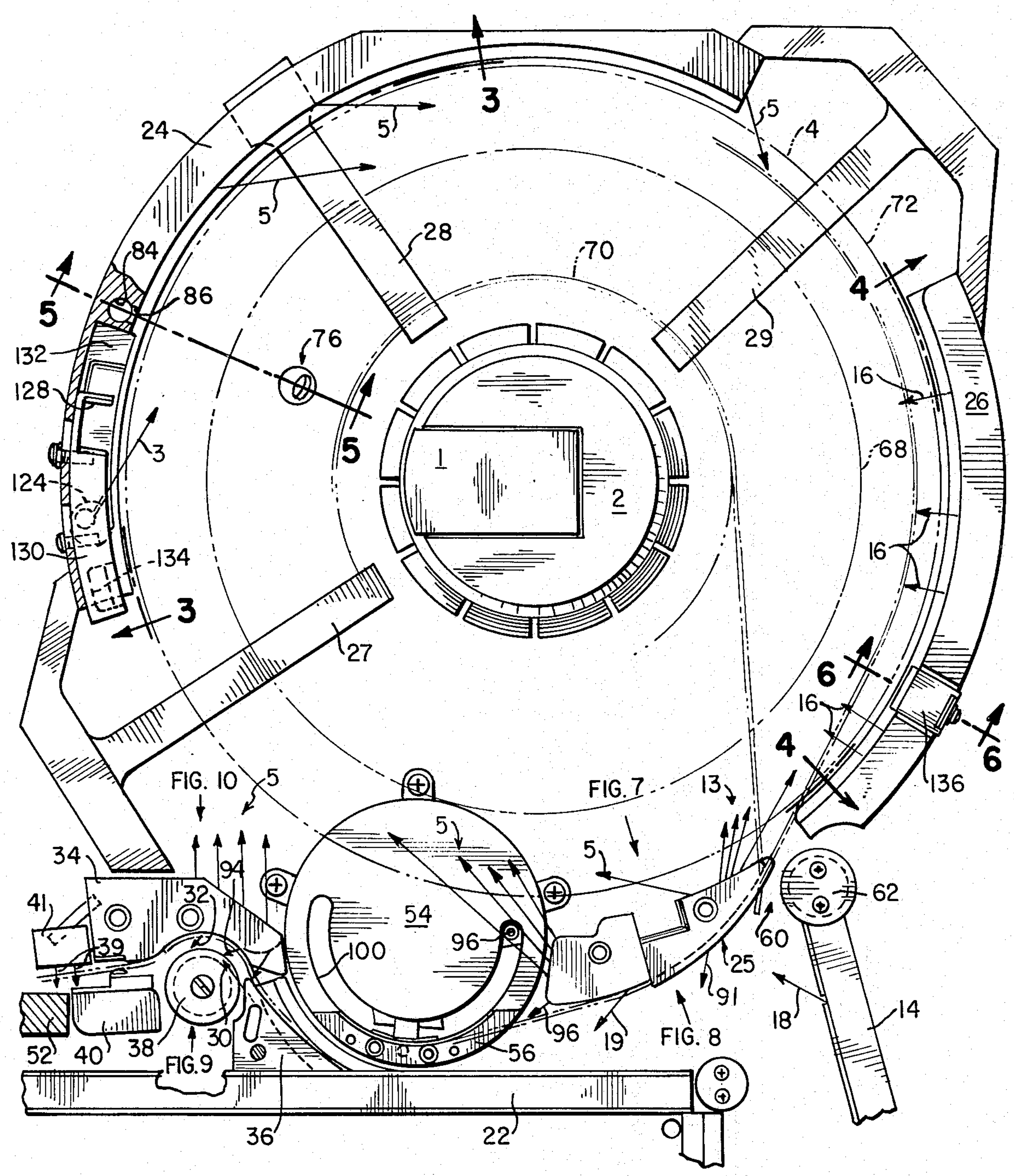
FIG. 2B is a plan view of the supply reel of the tape transport illustrated in FIG. 1.

Referring now to FIG. 2*b*, two different size reels are illustrated as being positioned on the hub 2. The smaller diameter reel 68 is shown to have a spool of tape 70 wound on it. The larger, 10 ½ inch reel 72 is shown to have a spool of tape 74 on it. Since the automatic threading of the tape transport operates differently for ten and one-half inch reels and for smaller reels, they are discussed separately below.

In order to automatically thread a 10 ½ inch reel of tape (and also a cartridge containing such a reel), the tape reel is positioned on the hub 2 and latched in place by the hub lever 1. When this is done, the optical sensing mechanism 76 (described in detail below) detects that a 10½ inch reel is located on the hub and signals the circuitry which controls rotation of the supply hub 2 during the loading operation. The next step in the automatic threading operation is to press the "load" button (not shown) on the control panel of the tape transport. Upon initiation of the load command, the tape reel is first rotated in a counterclockwise direction (so that the reel is "reeling-in" tape) so that the free end of the tape which typically falls out of the reel sideways is reeled in and captured between the reel flanges. Then the reel automatically begins rotating in the clockwise direction to unreel tape so that the free end of the tape is separated from the next layer and made to exit in a controlled fashion from between the reel flanges. The free end of the tape is then made to enter the tape-threading path through the chute 60. The tape is then moved through the tape-threading path as it continues to be unreeled. While the tape is being unreeled, it is not allowed to escape from between the reel flanges. If the tape did escape, it might fall below the reel and become entangled. The free end of the tape is then made to enter between the flanges of the take-up reel through the chute 64 (referring now to FIG. 2A) and is attached to the take-up reel core 8. The take-up reel is made to turn automatically so that the captured tape is wound on the take-up reel at a rate which will permit slack tape to develop between the two reels.

The apparatus in the tape transport of this invention for accomplishing the steps referred to above are now described.

Figures 4, 5, 6, 7, 8:
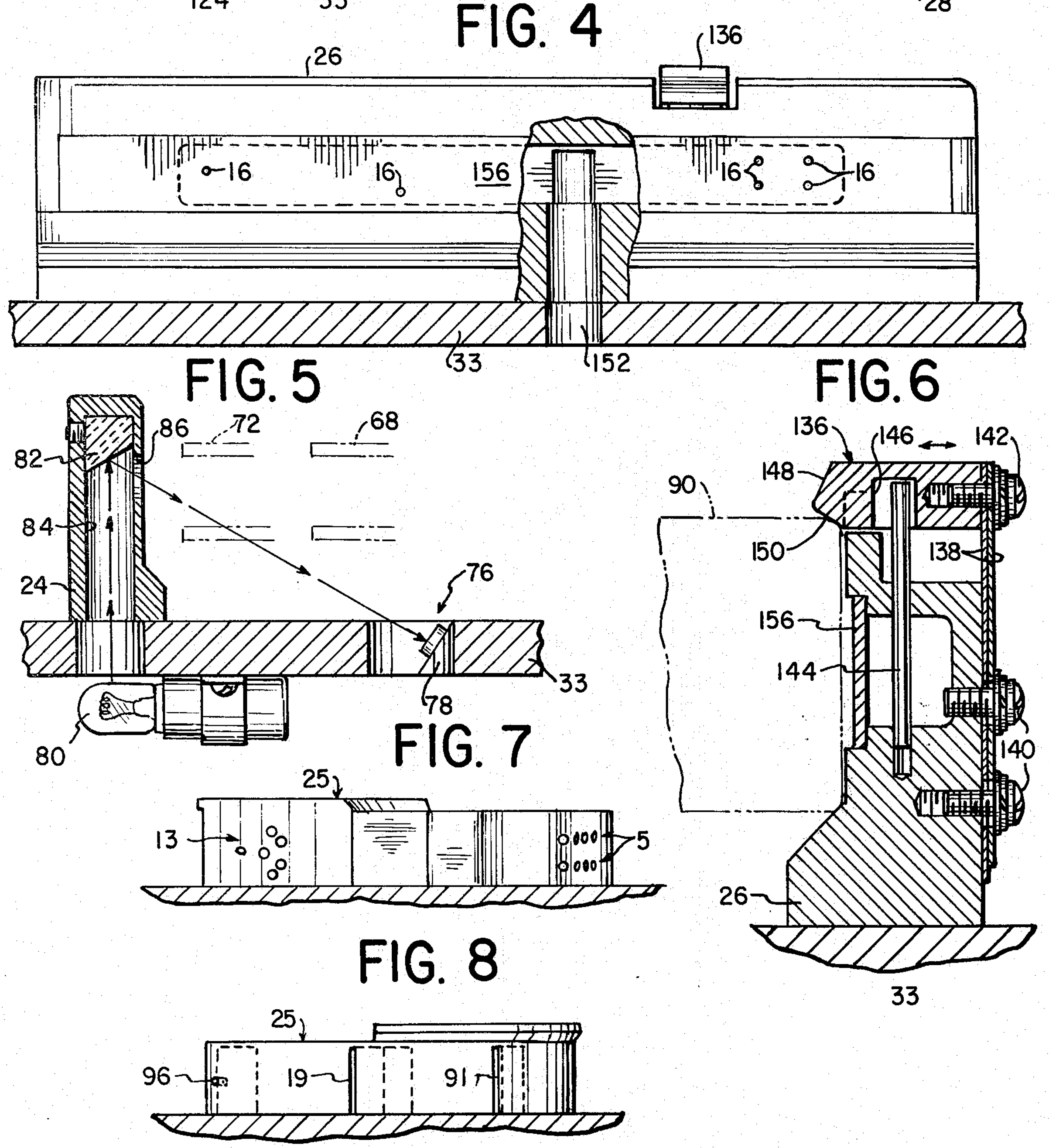
FIG. 4 is a developed section of a portion of the cartridge retainer element illustrated in FIG. 2B taken along the lines 4—4.
FIG. 5 is a developed section of the reel-sensing apparatus illustrated in FIG. 2B taken along the lines 5—5.
FIG. 6 is a cross-sectional view of the cartridge lug element illustrated in FIG. 2B taken along the lines 6—6.
FIG. 7 is a side elevational view of the block illustrated in FIG. 2B from the direction of the arrow designated FIG. 7.
FIG. 8 is a front elevational view of the block illustrated in FIG. 2B from the direction of the arrow designated FIG. 8.

After the tape reel is positioned on and latched onto the supply hub, the reel size sensor apparatus determines the size of the reel. Referring to FIGS. 2B and 5, the reel size sensor apparatus, generally designated 76, includes a photosensitive element 78 which is located in an aperture in the tape transport base surface 33 and a light source 80 which emits light to a reflector 82 positioned within a hollow projection 84 which is located within the cartridge retainer element 24. The light emitted from the light source is reflected from the projection 84 through an aperture 86 in the front surface of the projection, as best illustrated in FIG. 5, onto the photosensitive element 78 which is located on the base surface 33 so that a ten and one-half inch reel 72 will intercept the light emanating from the projection 84 and prevent it from reaching the photosensitive element 78, as illustrated in FIG. 5. However, light from a smaller reel, such as an 8 ½ inch reel 68, permits the light from the projection 86 to reach the photosensitive element 78.

Figure 3:
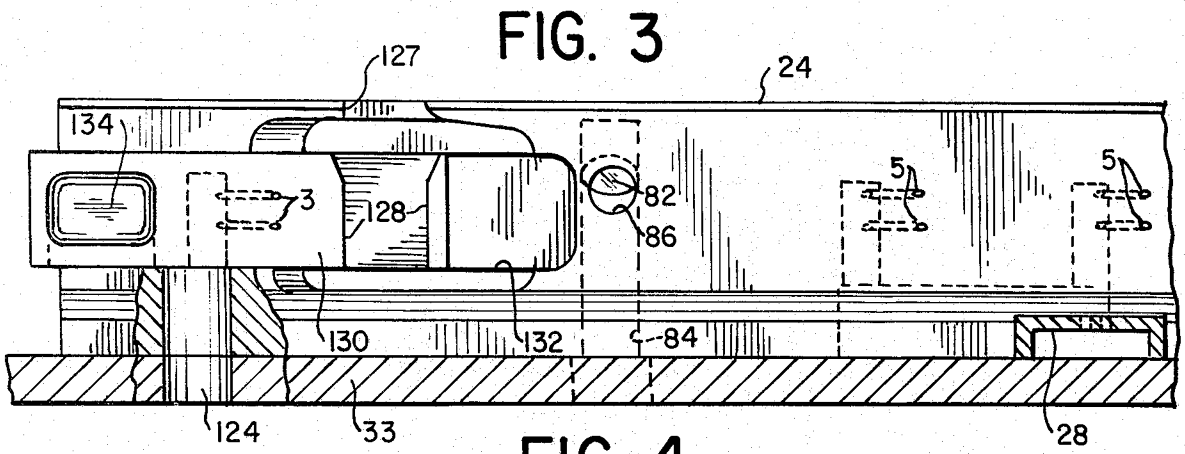
FIG. 3 is a developed section of the cartridge retainer element illustrated in FIG. 2B taken along the lines 3—3.
Figures 9, 10, 11, 12:
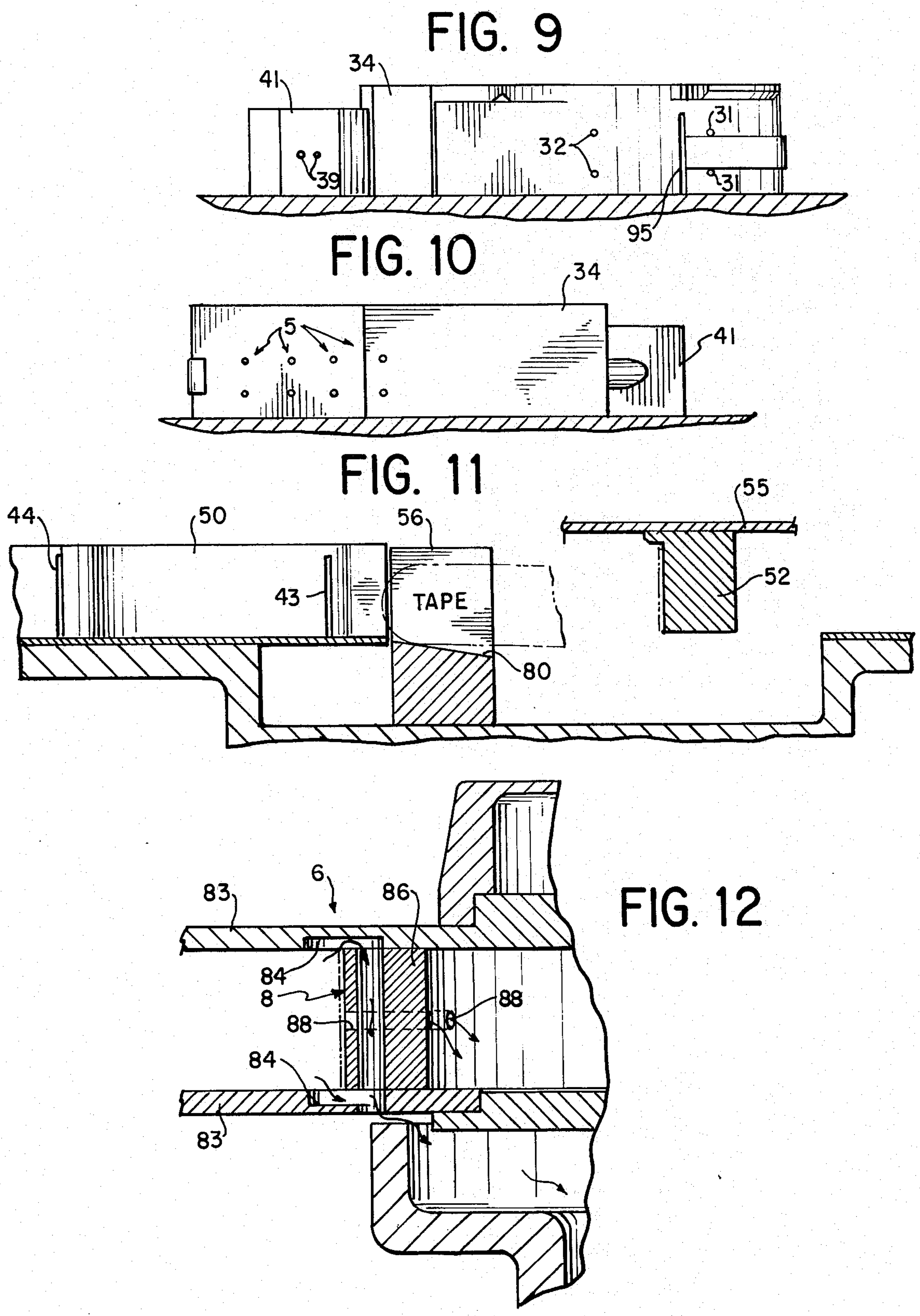
FIG. 9 is a front elevational view of the tape guide illustrated in FIG. 2B from the direction of the arrow designated FIG. 9.
FIG. 10 is a rear elevational view of the block illustrated in FIG. 2B from the direction of the arrow designated FIG. 10.
FIG. 11 is a developed sectional view of the apparatus illustrated in FIG. 2A taken along the line marked 11—11.
FIG. 12 is a developed sectional view of the hub of the reel illustrated in FIG. 2A taken along the lines designated 12-12.

The output of the photosensitive element is connected to circuitry which controls the rotation of the hub 2 after the "load" button on the tape transport is depressed. Thus, when the ten and one-half inch reel is positioned on the hub, the circuitry for controlling rotation of the hub is signalled to rotate the hub, first, in a counterclockwise direction for approximately 3 ½ turns which it has been found is sufficient to gather the tape which may have fallen from between the wheel flanges. The tape is assisted in being rewound between the reel flanges by a plurality of jets 3, 5 and 16, emanating from the inside surfaces of the cartridge retainer elements 24, 25 and 26 and block 34. These jets emit air which impinge on the tape and force it between the flanges of the reel as the reel turns in a counterclockwise direction. The jets are supplied by a positive air pressure system consisting of a motor-driven blower (not shown) which delivers air to the cartridge retainer elements 24 and 26. The air jets 3 and 5 emanating from cartridge retainer element 24 are illustrated in FIG. 3; the air jets 5 emanating from cartridge retainer element 25 are illustrated in FIG. 7; the air jets from block 34 are illustrated in FIG. 10; and the air jets 16 emanating from cartridge retainer element 26 are illustrated in FIG. 4. Referring to FIG. 3, the air supply to cartridge retainer element 24 is conducted through vertical conduit 124 to the air jet 3. Similar vertical conduits feed air jets 5. Referring to FIG. 4, the air supply to cartridge retainer element 26 is conducted through vertical conduit 152 and plenum 156 to air jets 16.

When a reel whose diameter is less than 10 ½ inches is placed on the hub, the light reflected from projection 84 impinges on the photosensitive element 78 and signals the circuitry which controls the rotation of the supply hub. This circuitry does not permit the hub to rotate, first, in a counter-clockwise direction in order to reel in tape 9as with 10 ½ inch reels) because it is necessary to manually initiate automatic threading of tapes on tape reels less than 10½ inches in diameter. With these smaller reels, the free end of the tape must be manually positioned in the chute 60 (as illustrated in FIG. 2B) after the reel 68 is positioned on the hub. After the leading end of the tape is placed within the chute 60, the automatic threading of the tape on these smaller reels proceeds in the same manner as with the standard 10 ½ inch reels, as described below.

After all the tape is packed onto the 10 ½ inch reel 72 by virtue of the counterclockwise rotation of the reel described above, the circuitry which controls rotation of the hub 2 causes the hub to rotate in the clockwise direction so as to begin to unreel tape. The leading end of the tape rotates with the reel to a position at which the air jets 13 in the cartridge retainer element 25 impinge on the leading end of the tape and separate it from the next lower layer of tape. The rotation of the reel continues while air jets 13 impinge on the tape so that the jets continue to peel tape from the reel. The action of the air jets 13 and the rotation of the reel cause the leading end of the tape to enter the chute 60. Referring to FIG. 7, the air jets 13 are designed to create a continuous air wall against the leading end of the tape. This is accomplished by graduating the size and number of the air jets 13 so that the holes nearest the tape (left side of FIG. 7) are smaller and fewer, and the holes furthest from the tape are larger and more numerous. Another factor in creating the continuous air wall referred to above involves angling the jets so that the holes closest to the tape from the greatest angle with the tape while the holes farthest away from the tape form the smallest angles with the tape. This has been accomplished by positioning a 0.025 inch diameter hole at 34 ½°, a 0.032 inch diameter hole at 11°, two 0.039 inch diameter holes at 7° and two 0.039 inch diameter holes at 4°. The peeling action of jets 13 would continue up-tape from the leading end of the tape in an uncontrolled manner, possibly blowing tape off from the flange of the reel, were it not for the containing action of the air jets 16 which maintain a tight tape pack. It is noted that the air jets 16 direct a stream of air in a direction substantially perpendicular to the tape surface.

Once the leading end of the tape is through chute 60, it is at the entrance of the tape-threading path. The tape is forced by air jets 18 which are located on the surface of angled rail 14 against the outer curved surface of cartridge retainer element 25. Air jet 19 which emanates from the outer surface of cartridge retainer element 25 is in a direction almost parallel to the path of the tape so that it lowers the pressure on the inner side of the tape so that the tape may remain close to the outer surface of the cartridge container element 25. Referring to FIG. 8, air jet 19 emanates from a slot in the outer surface of cartridge retainer element 25. Air jet 91 which also emanates from a slot in the outer surface of cartridge retainer element 25 also helps to keep the tape in close proximity to the outer surface of element 25 and, further, urges or pulls the tape along the threading path.

As the rotation of the reel and the action of the above-described air jets continue, the leading end of the tape proceeds past the cartridge retainer element 25, further aided by air jets 96, and across the platform member 56 which supports the side edge of the tape. As the tape continues along the threading path by virtue of the rotation of the reel and the action of the above-described air jets, the tape is supported by a tape guide block 36 which also supports the side edge of the tape. The tape guide block 36 is angled upwardly in the direction of the threading path so that the tape climbs the angular face of the block as it proceeds along the threading path.

It is desirable to prevent the tape from contacting the spring-loaded flanges of the round tape guide 38 because these would introduce an undesirable amount of friction during the tape-threading operation. This is accomplished by air jet 30 which emanates from the side surface of tape guide block 36 and which pushes the tape away from the flanges of the tape roller. Referring to FIG. 9, air jet 94 which emanates from a slot located in the side surface of tape guide block 34 reduces the pressure on the inner side of the tape and provides lubrication so that the tape is guided along the concentric contour of the tape guide block 34. Air jets 31 and 32 also provide lubrication which prevents the tape from adhering to the surface of block 34.

Referring to FIGS. 2B, 9 and 11, from the tape guide block 34, the tape proceeds in essentially a straight line, free of obstructions, past the end of the tape-sensing mechanism 40 and the tape cleaner 41 (from which air jets 39 are directed toward the tape to keep it away from the tape cleaner) where the tape is steered by the projection 52 on the tape transport cover (a portion of which is designated 55 in FIG. 11) past the read-write head 46, along an upwardly inclined ramp 80 on tape guide block 58 to round tape guide 48.

Referring now to FIGS. 2A and 11, it is desirable to prevent the tape from engaging the flanges of the tape roller 48, as it was with respect to tape guide 38, so that air jet 42 in block 82 forces the tape away from the roller and towards the contoured surface of tape guide block 50 from which air jets 43 and 44 emanate from the slots in the block. These last-mentioned air jets tend to reduce the pressure on the inside surface of the tape and act as a lubrication for the tape as it passes along tape guide block 50.

When the leading end of the tape reaches the end of the elongated tape guide block 50, it is acted upon by air jet 47 which is positioned within the angled side rail 20. Air jet 47 forces the free end of the tape between the flanges of the take-up reel 6.

The pressure in the area between the tape reel flanges is lower than the pressure outside the confines of the reel flanges 83. This is accomplished by commutating a vacuum blower (not shown) to a plurality of ports 84 which are locqted within the reel flanges. These ports are illustrated in detail in FIG. 12.

During the automatic threading operation, the take-up reels are controlled by circuitry which cause the reels to rotate in a clockwise direction. As a result of the commutating vacuum on the ports 84 in the reel flanges, and the rotation of the take-up reel 6, the leading end of the tape reaches the take-up reel core 86.

Referring now to FIGS. 2A and 12, a plurality of vacuum ports 88 are located about the surface of core 86. The commutating vacuum is also conducted to the ports 88 so that when the leading end of the tape arrives at the reel core, the vacuum ports 88 cause the tape to adhere to the core. After a few turns of the take-up reel in the clockwise direction, the tape securely adheres to the core in a slip-free manner, and both the commutating vacuum and the positive air pressure system which feeds the air jets may be turned off. The threading portion of the load cycle for the 10½ inch diameter reel is then completed.

In the event that the tape from a 10½ inch reel is not correctly threaded on the first try, which is determined by sensing that tape has not reached certain checkpoints by a certain time, both the supply reel and the take-up reel turn in a counterclockwise direction to allow the tape to be rewound on the supply reel. Then, after a certain electronic count, the take-up reel turns clockwise and begins the threading operation once again.

The tape transport of this invention also permits the automatic threading of a tape reel which is enclosed in a cartridge such as, for example, the cartridge manufactured by IBM, known as the "Easy Load" cartridge. These cartridges are well known to those in the tape transport field. The automatic threading of such tape cartridges takes place in the same manner as described above with respect to the 10½ inch reel. However, because of the additional structure of the cartridge, additional steps must be performed prior to the initiation of the automatic tape-threading operation. One of the features of this invention is that these steps are all performed automatically once the cartridge is placed on the hub.

Referring now to FIG. 1, in the tape transport of this invention, the supply reel 4 and the take-up reel 6 are positioned directly adjacent one another in a substantially horizontal plane and the vacuum columns 10 and 12 associated with each of these reels extend in a lateral direction and are directly adjacent one another. This configuration of the vacuum chambers and the tape reels permits a substantial saving in the amount of space occupied by the reels and the vacuum columns in comparison to tape transports mounted in a vertical plane where the vacuum columns are oriented in a longitudinal direction. The compactness of the tape transport of this invention made it difficult to accommodate tape cartridges, such as the Easy Load cartridge referred to above, because of the additional structure on these cartridges, particularly the latching element 98, illustrated in FIGS. 13 and 14. However, this is accomplished by the features described below without the necessity for shortening the vacuum columns which would result in a lessening of the overall performance of the tape transport.

Figure 13:
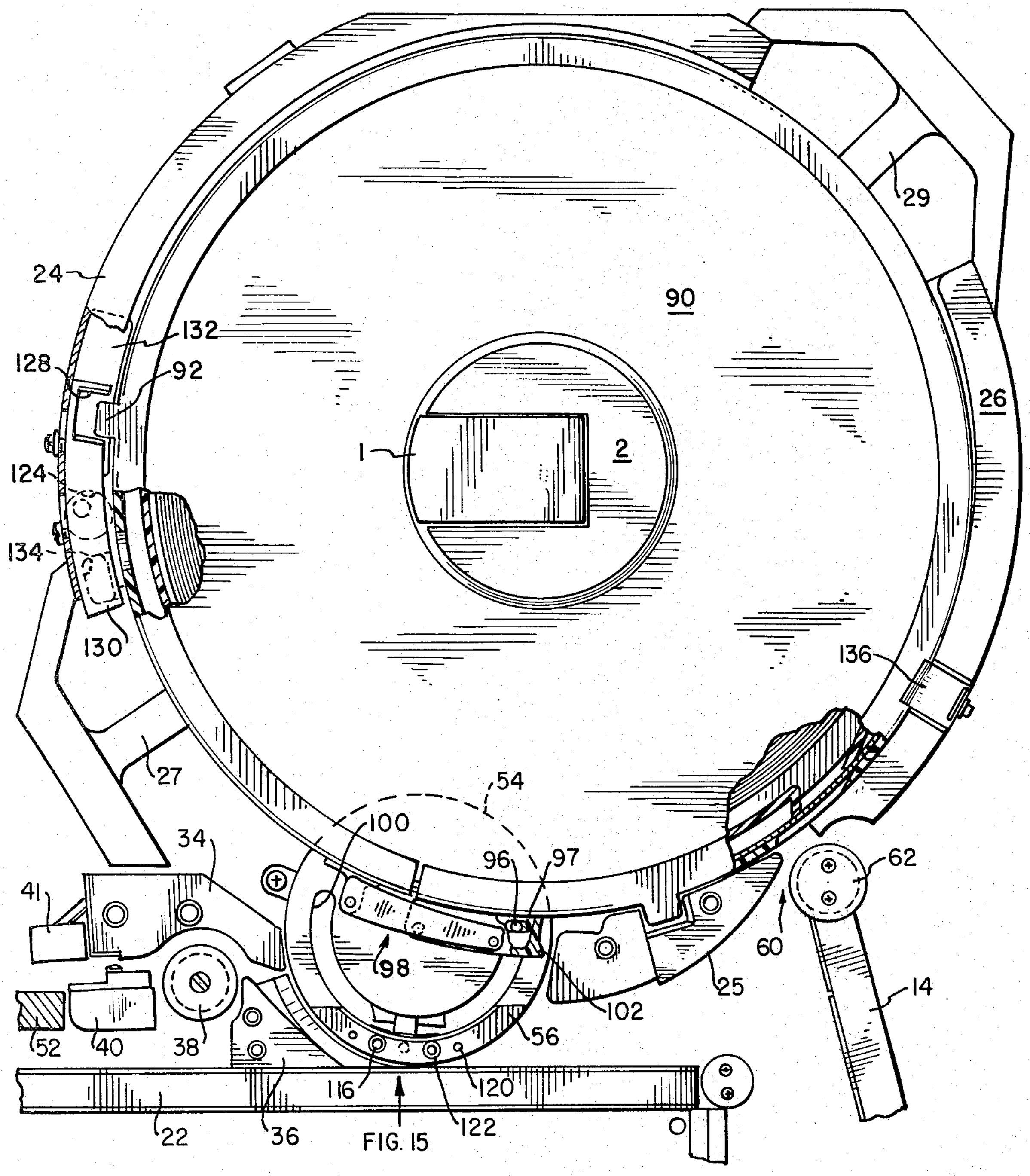
FIG. 13 is an enlarged plan view of a tape cartridge in the unlatched position with parts broken away.

Referring to FIG. 13, a cartridge 90 is positioned on hub 2. It is noted that the cartridge includes a lug element 92, which fits within a corresponding recess in cartridge retainer element 24, and a lug element 93 which fits within a corresponding recess in cartridge retainer element 25.

Figure 15:
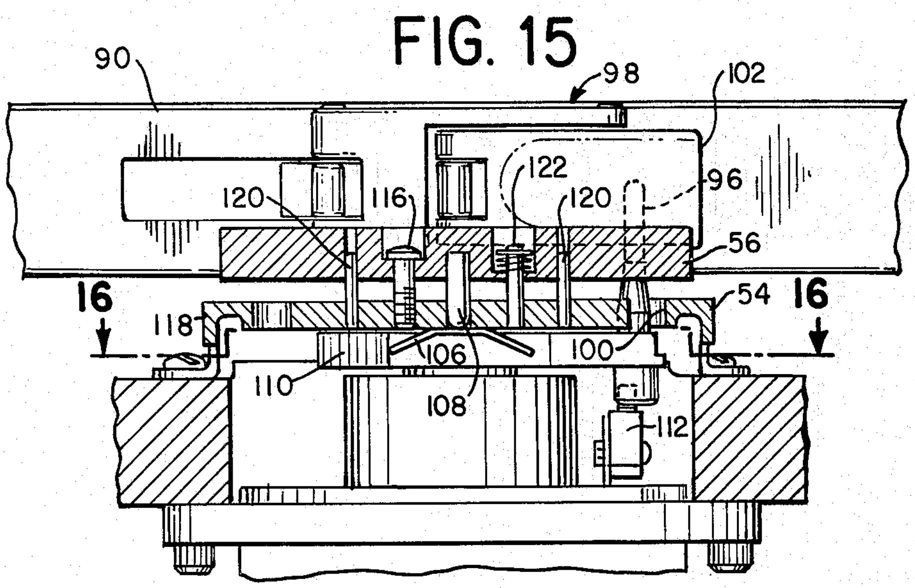
FIG. 15 is a developed sectional view of the platform raising and lowering apparatus illustrated in FIG. 13 from the direction of the arrow designated FIG. 15.

Referring to FIG. 15, the tape transport of this invention contains a cartridge-latching mechanism 54 which includes an upwardly projecting pin 96 which is adapted to engage a corresponding recess in the cartridge latch 98. A portion of the latch is broken away in FIG. 13 in order to show the pin 96 located within the aperture 97 of the cartridge-latching element 98.

Figure 14:
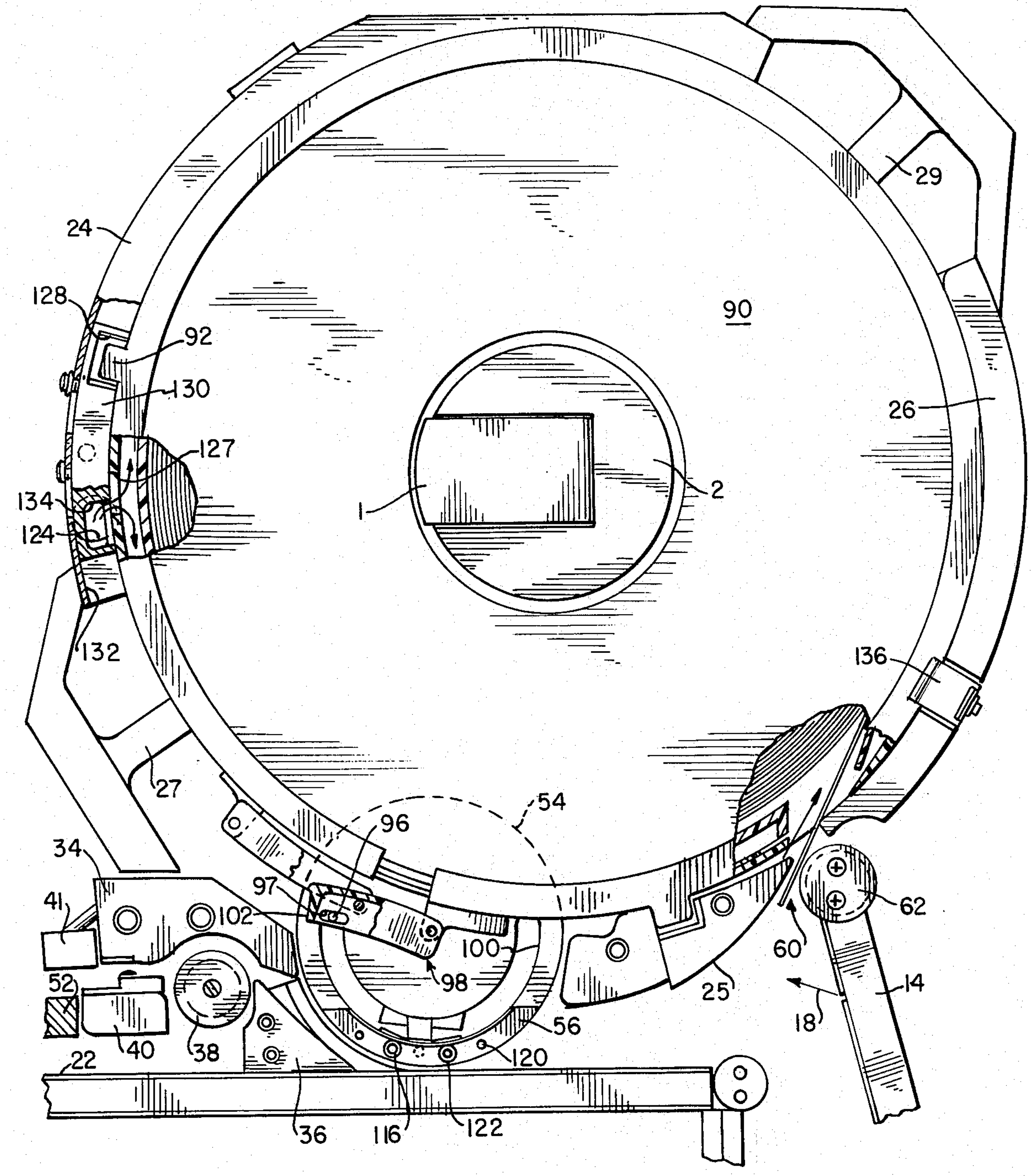
FIG. 14 is an enlarged plan view of a tape cartridge in the latched position with parts broken away.

After the cartridge 90 is positioned on the hub so that the pin engages the aperture 97 in the cartridge-latching element 98, and upon depression of the "load" button on the tape transport control panel, the pin 96 moves approximately 180°, along the semicircular groove 100, from the closed or latched position indicated in FIG. 13 to the open or unlatched position indicated in FIG. 14. As the pin moves from the latched to the unlatched position, it opens the cartridge-latching element 98 so as to permit unreeling of the reel of tape within the cartridge.

FIG. 13 shows the cartridge in its closed or latched position. FIG. 14 shows the cartridge in its open or unlatched position. It is noted that the cartridge expands circumferentially when it is unlatched and seats itself within the cartridge retainer elements 24, 25 and 26 of the tape transport.

Referring now to FIG. 13, it is noted that the outermost portion 102 of the cartridge-latching element 98 extends beyond the groove 100 and crosses over the tape path platform 56 during the unlatching operation described above. During normal operation of the tape transport, this platform is raised to provide support for the side edge of the tape. However, during the unlatching operation, the raised platform 56 would interfere with the movement of the cartridge-latching element outermost portion 102 during the cartridge-unlatching operation. Consequently, during the unlatching operation, the platform is lowered as the cartridge-latching element outermost portion passes over it, and is raised again after the cartridge-latching element outermost portion reaches the unlatched position illustrated in FIG. 14. Similarly, during the latching operation when pin 96 moves from the position illustrated in FIG. 14 to the position illustrated in FIG. 13, the platform 56 moves downwardly until the latching element outermost portion 102 has passed and then the platform rises again.

Figure 16:
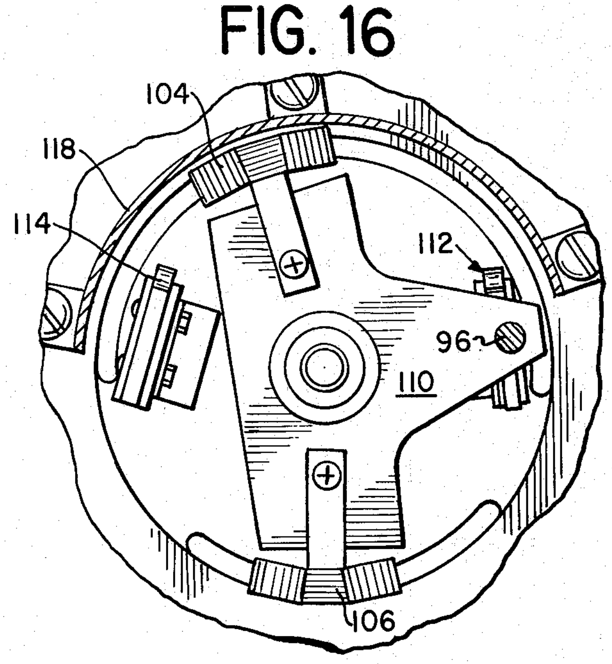
FIG. 16 is a cross sectional view of the apparatus illustrated in FIG. 15 taken along the lines 16—16.

This is accomplished by the mechanisms illustrated in FIGS. 15 and 16. Referring now to FIG. 15, the platform 56 is illustrated in its raised position.

The raising and lowering of the platform 56 is controlled by the interaction of camming surfaces 104 and 106 with a pin element 108 which is embedded in the underside of platform 56. As illustrated in FIGS. 15 and 16, the camming surfaces 104 and 106 each includes an upwardly inclined surface, a flat surface and a downwardly inclined surface.

Pin 96 is mounted on rotatable element 110. Rotation of element 110 is controlled by a motor (not shown) positioned beneath rotatable element 110. Actuation of the motor is controlled by depression of the "load" button on the tape transport control panel. Actuation of the motor causes the element 110 to rotate in a clockwise direction so that pin 96 moves from the position illustrated in FIG. 16 for approximately one hundred eighty degrees. When pin 96 engages microswitch 114, the actuation of the motor ceases and element 110 stops rotating. When the cartridge is to be relatched, appropriate controls on the tape transport are depressed and the motor is actuated to rotate element 110 in the counterclockwise direction approximately one hundred eighty degrees. When the pin 96 engages the microswitch 112, actuation of the motor ceases and element 110 stops rotating.

As element 110 rotates in the clockwise and counterclockwise directions, camming elements 104 and 106, which are attached to the element 110, rotate with it. Cams 104 and 106 are positioned on element so that the pin 108 which is embedded into the underside of platform 56 is only engaged by the camming surfaces when the pin 96 on the cartridge-latching element 54 is located in either of its two extreme positions, that is, the latched position illustrated in FIG. 13 or the unlatched position illustrated in FIG. 14. When pin 96 is in either of these positions, the flat portion of the cam elements 104 and 106 engage the pin 108 so as to support the platform 56 in its raised position. A screw 116 is threaded into the cover plate 118 of the rotatable element 110. The screw 116 is fastened through the platform 56 which has been counterbored to receive it. The screw 116 limits the upward movement of the platform 56 and permits platform 56 to lower when pin 108 moves off of the camming elements 104 and 106. Aligning pins 120 are embedded in the cover plate 118 and fitted within corresponding apertures in the platform 56 to ensure that the platform is raised and lowered in a substantially vertical manner. Also, pin 122 is embedded in cover plate 118 and fitted within a corresponding counterbored aperture in platform 56. A spring member is positioned beneath a washer on the portion of pin 122 within the counterbored aperture in cover plate 118. This tends to force the cover plate 118 downwardly after the pin 108 moves off of the camming surfaces 104 and 106.

Another feature of this invention relates to the cartridge retainer element 24. The drawings which relate to this feature are FIGs. 3, 13 and 14. Referring to FIG. 3, when a standard ten and one-half inch reel such as reel 72 is on the hub 2, air jets 3 which emanate from the inner surface of the cartridge retainer element 24 impinge on the tape in the reel in the direction shown in FIG. 2B in order to maintain a tightly packed reel. Air is supplied to the jets 3 through a conduit 124 which is connected to an air supply (not shown). Other vertical conduits provide air for the jets 5 on the right side of FIG. 3.

When a cartridge is placed on the hub 2, the cartridge lug 92 is positioned within a corresponding aperture 128 in the cartridge retainer element 24. During the automatic unlatching of the cartridge which was described above, the portion of the cartridge to the left of the cartridge-latching element in FIG. 13 moves in a clockwise direction. Thus, lug 92 and aperture 128 move in a clockwise direction during the unlatching operation. In order to permit aperture 128 to move with lug 92, aperture 128 is formed within a movable block 130 which is located within the cartridge retainer element 24 in track 132. The movable block 130 includes the lug aperture 128, the air jets 3 and the cartridge air opening 134. As the block 130 moves counterclockwise within track 132, the cartridge air opening 134 is positioned over the air conduit 124 and the air jets 3 are isolated from any air supply. This permits the air supply to be conducted through the conduit 124 and the opening 134 into a corresponding opening (not shown) in the wall of the cartridge which provides an air supply for air jets located within the cartridge which act on the tape reel in a similar manner to the air jets 3, 5 and 16 described above which are used during the automatic threading of tape from the reel.

During the cartridge latching operation, the block 130 moves in a counterclockwise direction in the track 132 to the position illustrated in FIG. 2B under the influence of a spring member (not shown) which is attached to the end of block 130 adjacent to the aperture 134 illustrated in FIG. 3.

Referring now to FIG. 6, a retainer lug 136 for the tape cartridge is illustrated. The retainer lug 136 is used to hold the cartridge in place. Retainer element 136 is connected to the cartridge retainer element 26 by two leaf springs 138. The leaf springs are attached to the cartridge retainer element 26 by two screws 140. A screw 142 connects the leaf springs to the retainer element 136. A pin 144 is positioned within an aperture in the cartridge retainer element 26. The upper portion of the pin fits within an aperture 146 in the lug element 136. The pin limits the horizontal movement of the lug 136. When a cartridge is placed on the hub of the tape transport, the bottom surface of the cartridge engages the cam surface 148 of the lug element 136 and pushes the retainer element horizontally outwardly. When the cartridge is pushed past the cam surface, the springs 138 exert a force on the retainer element to push the lug element horizontally inwardly so as to capture the cartridge under the surface 150 of the retainer element 136.

After the cartridge is positioned on the hub and the load button is depressed on the tape transport, the cartridge is automatically unlatched and provided with an internal air supply and the automatic threading of tape in the cartridge takes place in the same manner as with a ten and one-half inch reel, which is described above.

While the preferred embodiment of various aspects of the invention has been shown in the drawings, it is to be understood that this disclosure is for the purpose of illustration only and that various changes in shape, proportion and arrangement of parts, as well as the substitution of equivalent elements for those herein shown and described, may be made without departing from the spirit and scope of the invention as set forth in the appended claims.

What is claimed is:

1. In a tape transport mechanism having a base surface, apparatus for automatically threading tape onto a take-up reel or cartridge from a supply reel or cartridge of the type having a pivotally mounted latching element attached to the outer periphery of the cartridge, said latching element being rotatable to an open or closed position, said take-up reel or cartridge and said supply reel or cartridge being mounted for rotational movement in a substantially horizontal plane and being laterally spaced from one another, the distance between said take-up reel or cartridge and said supply reel or cartridge being designated the tape path, comprising: means for pneumatically guiding the tape from said supply reel or cartridge, through said tape path and onto said take-up reel or cartridge; means positioned adjacent said supply reel or cartridge for engaging said supply cartridge latching element and rotating said latching element across said tape transport base surface approximately 180 degrees, thereby defining the path of travel of said latching element; and means for providing edge support for said pneumatically guided tape along said tape path, said edge support means including a vertically movable platform positioned in the path of travel of said latching element.

2. The apparatus recited in claim 1 further comprising: means positioned beneath said platform for lowering said platform during rotation of said latching element and raising said platform upon said latching element reaching said opened or closed position.

3. The apparatus recited in claim 2, said platform lowering and raising means comprising: a rotatable member positioned beneath said platform, means for rotating said rotatable element in correspondence with the movement of said cartridge latching element rotating means, a plurality of camming surfaces being formed on said rotatable element including a first camming surface for engaging and raising said platform and a second camming surface permitting said platform to lower.

4. The apparatus recited in claim 1, further comprising: means for generating an electrical signal to rotate said supply reel or cartridge in a direction opposite to the direction of threading in order to pack the tape on said supply reel or in said cartridge.

5. The apparatus recited in claim 4, said generating means comprising a photosensitive element located in said tape transport base surface, said photosensitive element being positioned a first predetermined distance from said supply reel or cartridge rotational axis; a light source located above said tape transport base surface, said light source being positioned a second predetermined distance from said supply reel or cartridge rotational axis; said photosensitive element and said light source being positioned relative to one another such that a supply reel of a predetermined size intercepts said light source and prevents light from said source reaching said photosensitive element.

6. The apparatus recited in claim 1, said pneumatically guiding means comprising a supply of pressurized air, a plurality of first air jets positioned about the periphery of said supply reel or cartridge connected to said air supply, said first jets impinging air on the outer surface of said tape to maintain said tape on said supply reel; and a plurality of second jets positioned adjacent said cartridge latching element engaging and rotating means connected to said air supply, said second jets impinging air on the inner surface of said tape to peel tape from said supply reel.

7. The apparatus recited in claim 6, further comprising means for connecting said air supply to the inside of said supply cartridge.

8. The apparatus recited in claim 7, said connecting means comprising a generally rectangularly shaped circumferential segment being positioned about the periphery of said supply reel or cartridge, a circumferentially movable block being positioned within said circumferential segment, said movable block having a first conduit for connecting said air supply to one of said first air jets in a first position and a second conduit for connecting said air supply to said cartridge in a second condition, and means for moving said block from said first position to said second position in order to connect said air supply to said cartridge.

9. The apparatus recited in claim 8, said cartridge having a lug formed on the outer periphery of said cartridge, said moving means comprising an aperture being formed in said circumferential segment and a corresponding aperture being formed in said movable block within said circumferential segment, said movable block and circumferential segment apertures being aligned with one another, said cartridge lub being positioned within said movable block aperture and being circumferentially movable within said circumferential segment aperture in response to the movement of said cartridge latching element rotating means in order to move said movable block from said first position to said second position.

10. The apparatus recited in claim 1, further comprising means for positively retaining said supply cartridge on said tape transport including a vertically extending support member positioned adjacent the periphery of said supply cartridge, a camming element being positioned atop said support member and connected thereto by a spring member, said camming element being laterally movable outwardly upon being engaged by said supply reel.

* * * * *